US012790247B2

(12) United States Patent
Wang et al.

(10) Patent No.: US 12,790,247 B2
(45) Date of Patent: Nov. 10, 2026

(54) METHOD AND APPARATUS FOR DESALINATION OF HIGH-SALT AND HIGH-CONCENTRATION ORGANIC WASTEWATER BY COUPLING THREE MEMBRANE SEPARATION TECHNOLOGIES

(71) Applicant: GUANGDONG UNIVERSITY OF TECHNOLOGY, Guangdong (CN)

(72) Inventors: Zhangxin Wang, Guangdong (CN); Longchao Wang, Guangdong (CN); Yuanmiaoliang Chen, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 402 days.

(21) Appl. No.: 18/592,412

(22) Filed: Feb. 29, 2024

(65) Prior Publication Data

US 2024/0294412 A1 Sep. 5, 2024

(30) Foreign Application Priority Data

Mar. 1, 2023 (CN) ......................... 202310197343.0

(51) Int. Cl.
*C02F 9/00* (2023.01)
*B01D 61/00* (2006.01)
(Continued)

(52) U.S. Cl.
CPC .............. *C02F 9/00* (2013.01); *B01D 61/005* (2013.01); *B01D 61/04* (2013.01); *B01D 61/10* (2013.01);
(Continued)

(58) Field of Classification Search
CPC .. C02F 9/00; C02F 1/441; C02F 1/444; C02F 1/445; C02F 2101/30; C02F 2103/08;
(Continued)

(56) References Cited

U.S. PATENT DOCUMENTS 9,102,544 B2 * 8/2015 Merryman ........... B01D 61/026
2021/0198136 A1 * 7/2021 Jani ...................... B01D 61/029

FOREIGN PATENT DOCUMENTS

CN 203833778 9/2014
CN 109748298 5/2019
CN 113023844 6/2021

OTHER PUBLICATIONS

Elorm Obotey Ezugbe et al., Membrane Technologies in Wastewater Treatment: A Review, Membranes 2020, 10, 89. (Year: 2020).*
(Continued)

*Primary Examiner* — Pranav N Patel
(74) *Attorney, Agent, or Firm* — JCIPRNET

(57) ABSTRACT

The present invention discloses a method and an apparatus for desalination of high-salt and high-concentration organic wastewater by coupling three membrane separation technologies. Wastewater is subjected to diffusion desalination to obtain diffusion desalination wastewater and diffusion desalination circulating water; the diffusion desalination circulating water is subjected to reverse osmosis to obtain pure water and high-concentration salt water; and the diffusion desalination wastewater is subjected to forward osmosis to obtain forward osmosis wastewater and forward osmosis circulating water, where the forward osmosis wastewater is desalted and concentrated wastewater.

17 Claims, 3 Drawing Sheets

(51) Int. Cl.

| | |
|---|---|
| ***B01D 61/04*** | (2006.01) |
| ***B01D 61/10*** | (2006.01) |
| ***B01D 61/58*** | (2006.01) |
| ***C02F 1/44*** | (2023.01) |
| *C02F 101/30* | (2006.01) |
| *C02F 103/08* | (2006.01) |

(52) U.S. Cl.

CPC .............. *B01D 61/58* (2013.01); *C02F 1/441* (2013.01); *C02F 1/444* (2013.01); *C02F 1/445* (2013.01); *B01D 2311/25* (2013.01); *B01D 2311/2673* (2013.01); *B01D 2311/2698* (2022.08); *B01D 2313/501* (2022.08); *B01D 2313/502* (2022.08); *B01D 2313/90* (2013.01); *B01D 2317/025* (2013.01); *B01D 2317/04* (2013.01); *B01D 2317/08* (2013.01); *C02F 2101/30* (2013.01); *C02F 2103/08* (2013.01)

(58) Field of Classification Search

CPC .... C02F 1/04; C02F 1/44; C02F 1/447; C02F 2001/5218; C02F 2301/08; C02F 2303/10; C02F 1/001; C02F 1/048; B01D 61/005; B01D 61/04; B01D 61/10; B01D 61/58; B01D 2311/25; B01D 2311/2673; B01D 2311/2698; B01D 2313/501; B01D 2313/502; B01D 2313/90; B01D 2317/025; B01D 2317/04; B01D 2317/08; B01D 61/002; B01D 61/025; B01D 2311/2643; Y02A 20/131

See application file for complete search history.

(56) References Cited

OTHER PUBLICATIONS

Yi Li et al., Performance characteristics of the diffusion driven desalination process, Desalination 196 (2006) 188â209. (Year: 2006).*

"Office Action of China Counterpart Application", issued on Aug. 7, 2023, p. 1-p. 8.

* cited by examiner

METHOD AND APPARATUS FOR DESALINATION OF HIGH-SALT AND HIGH-CONCENTRATION ORGANIC WASTEWATER BY COUPLING THREE MEMBRANE SEPARATION TECHNOLOGIES

CROSS-REFERENCE TO RELATED APPLICATION

This application claims the priority benefit of China application serial no. 202310197343.0, filed on Mar. 1, 2023. The entirety of the above-mentioned patent application is hereby incorporated by reference herein and made a part of this specification.

BACKGROUND

Technical Field

The present invention relates to the technical field of environmental engineering, and specifically relates to a method and an apparatus for desalination of high-salt and high-concentration organic wastewater by coupling three membrane separation technologies.

Description of Related Art

A large amount of high-salt and high-concentration organic wastewater is produced by industrial activities, and high-concentration salt and organic matter contained in the wastewater will lead to salinization of soil, eutrophication of water, pollution of groundwater, safety hazards of drinking water and other serious water environmental pollution problems, which bring serious threats to life and health.

The high-salt and high-concentration organic wastewater contains a large number of total dissolved solids and high-concentration organic pollutants. Conventional wastewater treatment methods include biological methods, and a commonly used biological method is an activated sludge method, where sludge and organic matter are allowed to get in full contact by an aeration method, and then the organic matter is metabolized and decomposed in a large amount of dissolved oxygen. However, since salinity has a great influence on the activated sludge method, salt-tolerant microorganisms are required to be domesticated, which takes a long period of time.

Desalination is a most important step in treatment of the high-salt and high-concentration organic wastewater, and thermal desalination is a most commonly used method, in which distillation desalination is a most representative method. At present, most of distillation desalination technologies for wastewater treatment are developed from a seawater desalination technology. According to a multiple effect distillation (MED) technology, multiple evaporators are connected in series, heated high-salt wastewater is evaporated in a former evaporator to generate steam, the steam is used as a heat source for a next evaporator, and finally, the steam is condensed into fresh water. According to multi-stage flash evaporation (MSF), by controlling the pressure in flash chambers to be lower than the saturated vapor pressure corresponding to heated salt water, the hot salt water entering the flash chambers is quickly vaporized, and then steam is condensed to produce fresh water. The multi-stage flash evaporation finally achieves the purposes of concentrating salt water and producing fresh water by gradually reducing the pressure of steam passing through the multiple flash chambers. According to a mechanical vapor recompression (MVR) technology, heated salt water is introduced into an evaporator to produce steam, the steam is compressed with a compressor, and the compressed steam is used as a heat source for a heating side of the evaporator and finally condensed into water. Evaporation consumes a lot of heat, so that the operating cost is increased. During evaporation treatment of the high-salt and high-concentration organic wastewater, foam is easily produced due to excessive organic matter in the wastewater, and water produced by evaporation also contains too much organic matter.

Membrane separation is a new separation technology with separation membranes as the core, which can achieve wastewater treatment with high efficiency and low consumption by separating pollutants and water. Ultrafiltration, nanofiltration and other membrane separation technologies have been applied in wastewater treatment processes. According to the ultrafiltration, with a pressure difference of 0.1-0.5 MPa as a driving force, porous membranes are used for separating substances in solutions by a physical rejection method, so as to screen different components in the solutions, which require external pressure. Nanofiltration membranes have smaller pore sizes and dense structures, which can retain smaller particles. However, as the nanofiltration membranes have dense membrane pore structures, higher pressures are required to force liquid purification, which have higher energy consumption than the ultrafiltration. Meanwhile, the nanofiltration membranes are more sensitive to scaling problems, and the membranes are easily contaminated and destroyed. Therefore, the current membrane separation technologies require external pressure treatment, which are difficult to effectively separate and filter the high-salt and high-concentration organic wastewater, have a low water production rate, a long operating time and high energy consumption, and cannot achieve circular sustainable desalination. Therefore, it is urgent to develop new membrane processes that can operate continuously and have high energy efficiency.

SUMMARY

The purposes of the present invention are to overcome the disadvantages of the prior art and provide a method and an apparatus for desalination of high-salt and high-concentration organic wastewater by coupling three membrane separation technologies.

The first purpose of the present invention is to provide a method for desalination of wastewater by coupling three membrane separation technologies.

The second purpose of the present invention is to provide an apparatus for desalination of wastewater by coupling three membrane separation technologies.

The three membrane separation technologies of the present invention refer to a diffusion membrane separation technology, a forward osmosis membrane separation technology and a reverse osmosis membrane separation technology, respectively. The diffusion membrane separation technology is used for desalination of wastewater, and forward osmosis is used for concentrating the organic wastewater after the desalination. By adopting the two methods, a driving force is generated only by concentration differences between liquids without external driving pressure. The diffusion membrane separation technology also reduces the membrane pollution degree. The reverse osmosis membrane separation technology is used for concentrating salt in water to obtain high-concentration salt water and pure water. On the one hand, a draw solution is provided for forward osmosis desalination. On the other hand, refined salt is recovered by evaporative crystallization, and pure water is also provided for diffusion desalination, so that circular sustainable desalination s achieved.

In order to achieve the above purposes, the present invention is implemented through the following schemes.

A method for desalination of wastewater by coupling three membrane separation technologies includes the following steps:

step S1: subjecting wastewater to diffusion desalination to obtain diffusion desalination wastewater and diffusion desalination circulating water;

step S2: subjecting the diffusion desalination circulating water in step S1 to reverse osmosis to obtain pure water and high-concentration salt water; and step S3: subjecting the diffusion desalination wastewater in step S1 to forward osmosis to obtain forward osmosis wastewater and forward osmosis circulating water, where the forward osmosis wastewater is desalted and concentrated wastewater; and subjecting the forward osmosis circulating water to reverse osmosis to obtain pure water and high-concentration salt water.

Preferably, in step S1, the wastewater is subjected to diffusion desalination after precise filtration.

Preferably, in step S1, the wastewater is subjected to diffusion desalination with pure water or diffusion desalination circulating water.

More preferably, in step S1, the wastewater is subjected to circular diffusion desalination with the pure water in step S2 and/or step S3.

Preferably, in step S3, the diffusion desalination wastewater is subjected to forward osmosis with the high-concentration salt water in step S2 or the forward osmosis circulating water in step S3.

Preferably, the high-concentration salt water in step S2 and/or step S3 is subjected to evaporative crystallization to obtain pure water and salt. The salt is refined and recycled.

Preferably, in step S2, the diffusion desalination circulating water is subjected to reverse osmosis when having a salt concentration of 20-25 g/L. The salt concentration of the diffusion desalination circulating water is controlled to further control the diffusion desalination rate, so that the diffusion desalination rate is maintained stable.

Preferably, in step S3, the forward osmosis circulating water is subjected to reverse osmosis when having a salt concentration of 15-25 g/L. The salt concentration of the forward osmosis circulating water is controlled to further control the forward osmosis rate, so that the forward osmosis rate is maintained stable.

Preferably, in step S3, the diffusion desalination wastewater is subjected to forward osmosis when having a salt concentration of 5-10 g/L. All the salt in the organic wastewater cannot be completely removed by the diffusion desalination to ensure that the wastewater after the desalination has a certain content of salt, which is used as an inorganic salt nutrient component required for subsequent biochemical treatment. The biochemical treatment cannot be performed when the salt content is low, and the biochemical treatment is difficult to perform when the salt content is high.

Preferably, the wastewater is high-salt and high-concentration organic wastewater.

An apparatus for desalination of wastewater by coupling three membrane separation technologies is provided. The wastewater treatment apparatus includes a pretreatment device, a diffusion desalination device, a forward osmosis device and a salt recovery device that are communicated with each other;

the pretreatment device includes a wastewater storage device, a pretreatment device body and a pretreatment post-storage device that are sequentially communicated with each other;

the diffusion desalination device includes a wastewater circulation storage device, a diffusion desalination component, a diffusion desalination circulating water storage device and a pure water storage device that are sequentially communicated with each other;

the pretreatment post-storage device of the pretreatment device is communicated with the wastewater circulation storage device of the diffusion desalination device;

the forward osmosis device includes a to-be-treated wastewater storage device, an organic wastewater circulation storage device, a forward osmosis component and a draw solution circulation storage device that are sequentially communicated with each other;

the wastewater circulation storage device of the diffusion desalination device is communicated with the forward osmosis component of the forward osmosis device;

the salt recovery device includes a reverse osmosis device and a mechanical vapor recompression (MVR) device that are communicated with each other; the reverse osmosis device includes a reverse osmosis circulating water storage device and a reverse osmosis component that are communicated with each other;

the diffusion desalination circulating water storage device of the diffusion desalination device is communicated with the reverse osmosis circulating water storage device of the reverse osmosis device of the salt recovery device;

the pure water storage device of the diffusion desalination device is communicated with the reverse osmosis component of the reverse osmosis device of the salt recovery device; the pure water storage device of the diffusion desalination device is communicated with the mechanical vapor recompression (MVR) device of the salt recovery device;

the draw solution circulation storage device of the forward osmosis device is communicated with the reverse osmosis circulating water storage device of the reverse osmosis device of the salt recovery device; and the reverse osmosis circulating water storage device of the reverse osmosis device of the salt recovery device is communicated with the mechanical vapor recompression (MVR) device of the salt recovery device.

Preferably, a fluid switch valve is also arranged between the wastewater circulation storage device of the diffusion desalination device and the forward osmosis component of the forward osmosis device.

Preferably, a fluid switch valve is also arranged between the diffusion desalination circulating water storage device of the diffusion desalination device and the reverse osmosis circulating water storage device of the reverse osmosis device of the salt recovery device.

Preferably, a fluid switch valve is also arranged between the draw solution circulation storage device of the forward osmosis device and the reverse osmosis circulating water storage device of the reverse osmosis device of the salt recovery device.

Preferably, a fluid switch valve is also arranged between the reverse osmosis circulating water storage device of the reverse osmosis device of the salt recovery device and the mechanical vapor recompression (MVR) device of the salt recovery device.

Compared with the prior art, the present invention has the following beneficial effects.

In the present invention, by performing the diffusion desalination based on differences of the selectivity of a membrane to salt and organic matter and gradient differences of the salt concentration at an interface, salt in the high-salt and high-concentration organic wastewater is diffused to one side of water containing low concentration salt, so that the salinity of the wastewater is reduced or eliminated, and the membrane pollution degree is reduced without affecting a desalination process. Further, the forward osmosis, the reverse osmosis and the evaporative crystallization are performed to produce salt and recover pure water for recycling. According to the diffusion desalination and the forward osmosis treatment, a driving force is generated by concentration differences between liquids without external driving pressure. The diffusion desalination has a salt flux of 15-20 g/($m^2 \cdot h$), and the forward osmosis has a water flux of 15-25 L/($m^2 \cdot h$). Thus, the desalination and the forward osmosis are stable. The present invention has the advantages of high desalination efficiency, a low membrane pollution degree, stable operation and a low cost in treatment of the high-salt and high-concentration organic wastewater.

Callouts are as follows: 1, pretreatment device; 2, diffusion desalination device; 3, forward osmosis device; 4, salt recovery device; 5, wastewater storage device; 6, pretreatment device body; 7, pretreatment post-storage device; 8, wastewater circulation storage device; 9, diffusion desalination component; 10, diffusion desalination circulating water storage device; 11, pure water storage device; 12, to-be-treated wastewater storage device; 13, organic wastewater circulation storage device; 14, forward osmosis component; 15, draw solution circulation storage device; 16, reverse osmosis device; 17, reverse osmosis circulating water storage device; 18, reverse osmosis component; 19, mechanical vapor recompression (MVR) device.

Figure 2:
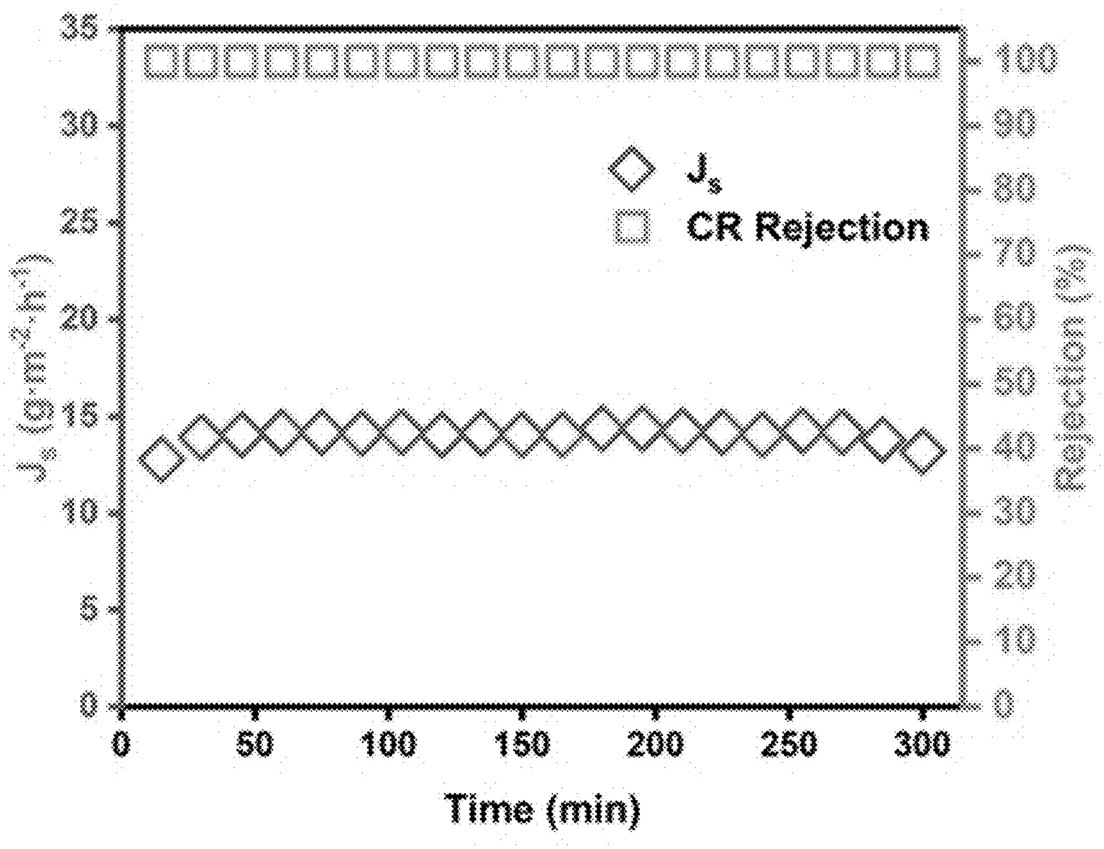

FIG. 2 shows the salt flux ($J_s$) in a diffusion desalination process and the rejection of organic matter in the diffusion desalination process in Example 2.

Figure 3:
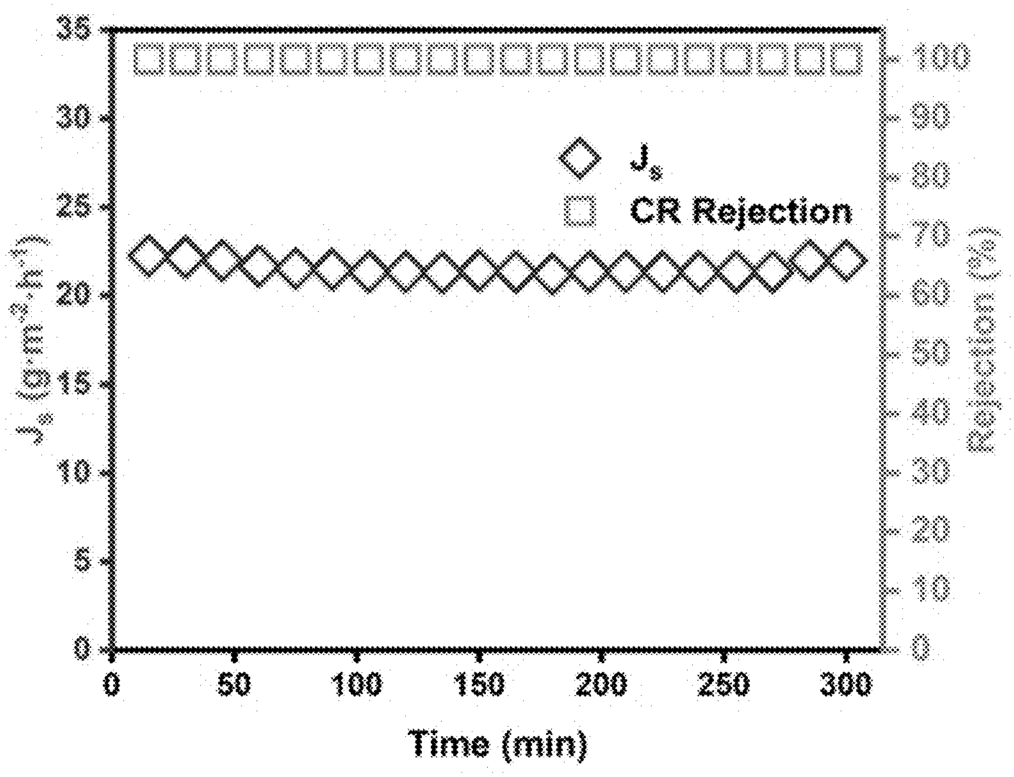

FIG. 3 shows the salt flux ($J_s$) in a diffusion desalination process and the rejection of organic matter in the diffusion desalination process in Example 3.

Figure 4:
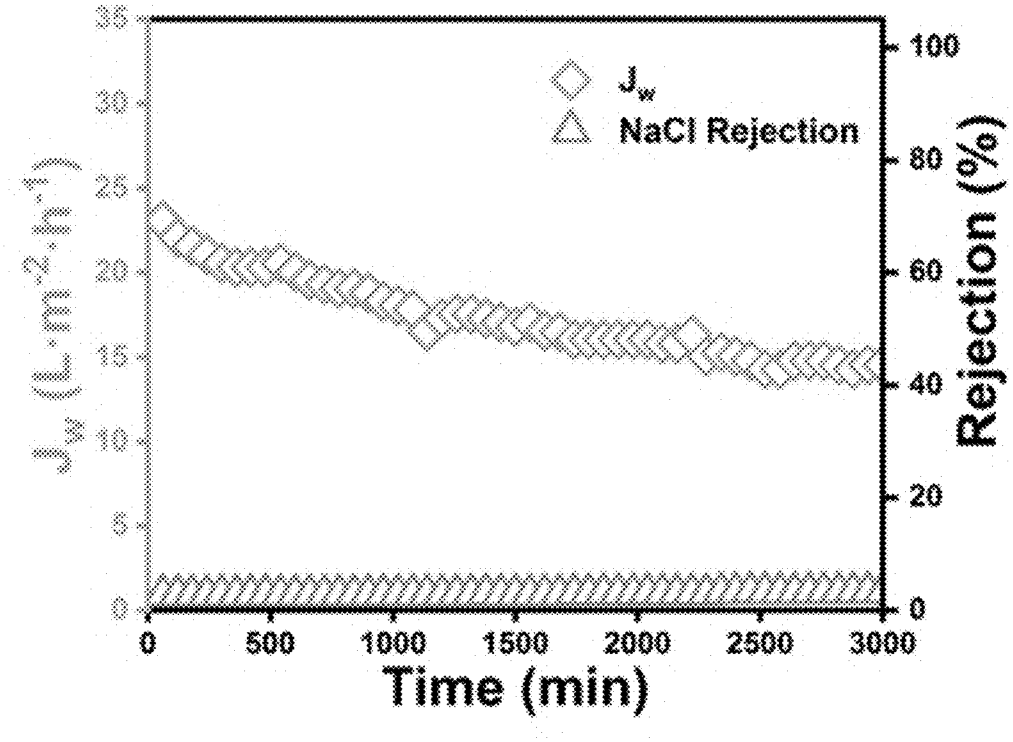

FIG. 4 shows changes of the water flux ($J_w$) with time during ultrafiltration.

DESCRIPTION OF THE EMBODIMENTS

The present invention is further illustrated in detail below in combination with drawings attached to the specification and specific embodiments. The embodiments are only used to explain the present invention and are not intended to limit the scope of the present invention. Unless otherwise specified, all test methods used in the following embodiments are conventional methods. Unless otherwise specified, all used materials, reagents and the like are commercially available reagents and materials.

Example 1 Apparatus for Desalination of High-Salt and High-Concentration Organic Wastewater by Coupling Three Membrane Separation Technologies I. Apparatus for Desalination of High-Salt and High-Concentration Organic Wastewater by Coupling Three Membrane Separation Technologies.

Figure 1:
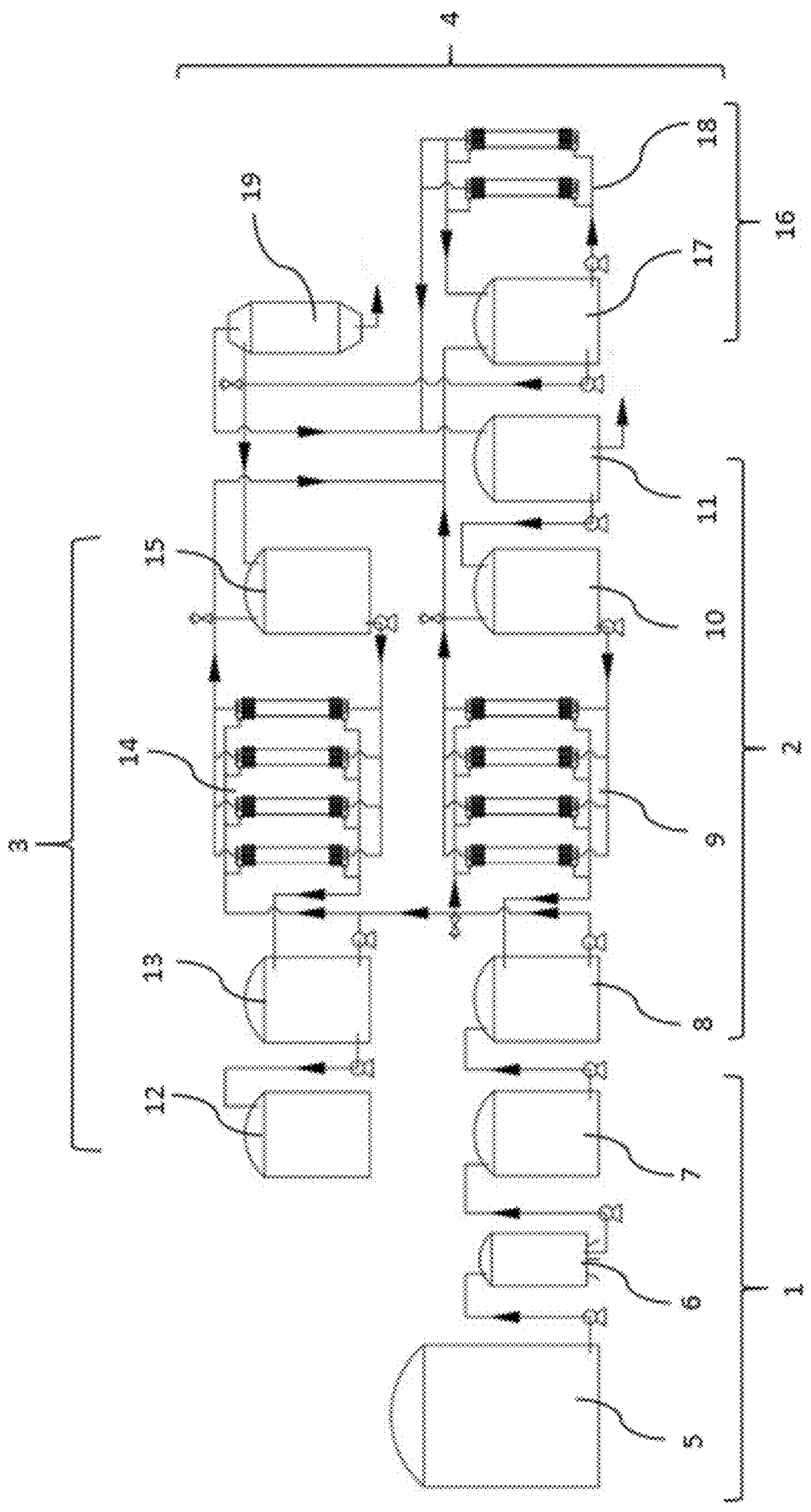
FIG. 1 shows an apparatus for desalination of high-salt and high-concentration organic wastewater by coupling three membrane separation technologies.

FIG. 1 shows an apparatus for desalination of high-salt and high-concentration organic wastewater by coupling three membrane separation technologies. The wastewater treatment apparatus includes a pretreatment device 1, a diffusion desalination device 2, a forward osmosis device 3 and a salt recovery device 4 that are communicated with each other.

The pretreatment device 1 includes a wastewater storage device 5, a pretreatment device body 6 and a pretreatment post-storage device 7 that are sequentially communicated with each other through pipes and pumps. The pretreatment device body 6 is a precise filter and is used for filtering out solid particle impurities in organic wastewater with a high salt content.

The diffusion desalination device 2 includes a wastewater circulation storage device 8, a diffusion desalination component 9, a diffusion desalination circulating water storage device 10 and a pure water storage device 11 that are sequentially communicated with each other through pipes and pumps. The diffusion desalination component 9 is detachably connected with a diffusion desalination membrane, which is a spiral wound membrane or a hollow fiber membrane and has an effective area of 20 $m^2$.

The pretreatment post-storage device 7 of the pretreatment device 1 is communicated with the wastewater circulation storage device 8 of the diffusion desalination device 2 through pipes and pumps.

The forward osmosis device 3 includes a to-be-treated wastewater storage device 12, an organic wastewater circulation storage device 13, a forward osmosis component 14 and a draw solution circulation storage device 15 that are sequentially communicated with each other through pipes and pumps. The forward osmosis component 14 is detachably connected with a forward osmosis membrane, which is a cellulose triacetate membrane and has an effective area of 25 $m^2$.

The forward osmosis component 14 of the forward osmosis device 3 and the diffusion desalination component 9 of the diffusion desalination device 2 are communicated with the wastewater circulation storage device 8 of the diffusion desalination device 2 through pipes and pumps, respectively, and a fluid switch valve is also arranged between the pipes and used for controlling the flow direction of liquid.

The salt recovery device 4 includes a reverse osmosis device 16 and a mechanical vapor recompression (MVR) device 19 that are communicated with each other through pipes and pumps. The reverse osmosis device 16 includes a reverse osmosis circulating water storage device 17 and a reverse osmosis component 18 that are communicated with each other through pipes and pumps.

The diffusion desalination circulating water storage device 10 of the diffusion desalination device 2 is communicated with the reverse osmosis circulating water storage device 17 of the reverse osmosis device 16 of the salt recovery device 4 through pipes and pumps, and a fluid switch valve is also arranged between the pipes and used for controlling the flow direction of liquid.

The pure water storage device 11 of the diffusion desalination device 2 is communicated with the reverse osmosis component 18 of the reverse osmosis device 16 of the salt recovery device 4 through pipes and pumps. The pure water storage device 11 of the diffusion desalination device 2 is communicated with the mechanical vapor recompression (MVR) device 19 of the salt recovery device 4 through pipes and pumps.

The draw solution circulation storage device 15 of the forward osmosis device 3 and the mechanical vapor recompression (MVR) device 19 of the salt recovery device 4 are communicated with the reverse osmosis circulating water storage device 17 of the reverse osmosis device 16 of the salt recovery device 4 through pipes and pumps, respectively, and a fluid switch valve is also arranged between the pipes and used for controlling the flow direction of liquid.

II. Use Method (1) Filtration: During use, all the fluid switch valves in the apparatus are turned off first, organic wastewater with a high salt content that is stored in the wastewater storage device 5 is transported through pipes and pumps to the pretreatment device body 6 for precise filtration to filter out solid particle impurities in the organic wastewater with a high salt content so as to obtain precisely filtered wastewater, and then the wastewater is transported to the pretreatment post-storage device 7 through pipes and pumps.

(2) Diffusion desalination: When the apparatus begins to operate, pure water provided from the outside is transported to the pure water storage device 11. The pure water is transported to the diffusion desalination circulating water storage device 10 through pipes and pumps, and then transported to the diffusion desalination component 9 through pipes and pumps.

The precisely filtered wastewater in the pretreatment post-storage device 7 is sequentially transported to the wastewater circulation storage device 8 and the diffusion desalination component 9 through pipes and pumps. By means of the diffusion desalination, the salt concentration of the precisely filtered wastewater is decreased, the salt concentration of the pure water is increased, and diffusion desalination wastewater is obtained.

Meanwhile, after the concentration of the pure water is increased, diffusion desalination circulating water is obtained, which is transported to the diffusion desalination circulating water storage device 10 through pipes and pumps and further transported to the diffusion desalination component 9 through pipes and pumps, so as to realize circular diffusion desalination.

(3) Reverse osmosis: When the diffusion desalination circulating water has a salt concentration of 20-25 g/L, the fluid switch valve between the diffusion desalination circulating water storage device 10 and the reverse osmosis circulating water storage device 17 is turned on to enable the diffusion desalination circulating water in the diffusion desalination circulating water storage device 10 to flow into the reverse osmosis circulating water storage device 17 through pipes and then flow into the reverse osmosis component 18. The diffusion desalination circulating water is subjected to circular concentration by reverse osmosis to produce salt water and pure water. The salt water is stored in the reverse osmosis circulating water storage device 17 and transported to the draw solution circulation storage device 15 through pipes and pumps to serve as a drawing solution for forward osmosis. The pure water is transported to the pure water storage device 11 through pipes and pumps.

Meanwhile, the pure water in the pure water storage device 11 is transported to the diffusion desalination circulating water storage device 10 through pipes and pumps to perform diffusion desalination continuously.

(4) Forward osmosis: When the diffusion desalination wastewater has a salt concentration of 5-10 g/L, the fluid switch valve between the wastewater circulation storage device 8 and the forward osmosis component 14 is turned on. The diffusion desalination wastewater is transported through pipes and pumps to the forward osmosis component 14 for forward osmosis, water in the diffusion desalination wastewater flows into the high-concentration salt water to decrease the volume of the diffusion desalination wastewater, increase the volume of the salt water and decrease the salt concentration of the salt water so as to obtain forward osmosis wastewater, and the forward osmosis wastewater is transported to the organic wastewater circulation storage device 13 through pipes and then stored in the to-be-treated wastewater storage device 12 through pipes and pumps, where the forward osmosis wastewater is organic wastewater with a low salt content.

The organic wastewater with a low salt content needs to contain a certain amount of salt, which is used as an inorganic salt nutrient component required for subsequent biochemical treatment. The biochemical treatment cannot be performed when the salt content of the wastewater is too low, and the biochemical treatment is difficult to perform when the salt content is too high.

The salt water in the forward osmosis component 14 is used as a draw solution for forward osmosis. In a forward osmosis process, the salt concentration of the draw solution is decreased, and the draw solution stored in the draw solution circulation storage device 15 is transported to the forward osmosis component 14 through pipes and pumps so as to achieve circular forward osmosis.

When the draw solution has a salt concentration of 15-25 g/L, the fluid switch valve between the draw solution circulation storage device 15 and the reverse osmosis circulating water storage device 17 is turned on, and the draw solution is transported to the reverse osmosis circulating water storage device 17 through pipes and pumps and continuously transported to the reverse osmosis device 16 to produce high-concentration salt water and pure water.

(5) Mechanical vapor recompression (MVR) treatment: The fluid switch valve between the reverse osmosis circulating water storage device 17 and the mechanical vapor recompression (MVR) device 19 is turned on, a part of the salt water in the reverse osmosis circulating water storage device 17 is transported to the mechanical vapor recompression (MVR) device 19 through pipes and pumps for evaporative crystallization so as to obtain pure water and salt, the pure water is transported to the pure water storage device 11 through pipes, and the salt is refined for recycling.

Example 2 Method for Desalination of High-Salt and High-Concentration Organic Wastewater by Coupling Three Membrane Separation Technologies I. Water Quality of High-Salt and High-Concentration Organic Wastewater to be Treated:

The chemical oxygen demand (COD) is 10,000 mg/L, the NaCl content is 70 g/L, and the wastewater volume is 1 ton. The electrical conductivity is measured by an electrical conductivity meter, and then the salt concentration of the water is calculated.

II. Method for Desalination of Wastewater

The high-salt and high-concentration organic wastewater to be treated is subjected to desalination by using the device in Example 1.

1. Precise filtration: The high-salt and high-concentration organic wastewater to be treated is subjected to precise filtration to filter out solid particle impurities (suspended particles with a particle size of greater than 10μ) in the high-salt and high-concentration organic wastewater so as to obtain precisely filtered wastewater.

2. Diffusion desalination: When the operation begins, 500 kg of pure water is provided from the outside and stored in the pure water storage device. Then, the precisely filtered wastewater is subjected to diffusion desalination with 300 kg of the pure water, where the precisely filtered wastewater and the pure water have gradient differences in concentration at an interface of a spiral wound membrane, salt is diffused from the precisely filtered wastewater side to the pure water side to decrease the salt content of the precisely filtered wastewater and increase the salt content of the pure water, and diffusion desalination wastewater is obtained. Meanwhile, after the salt content of the pure water is increased, diffusion desalination circulating water is obtained, and the precisely filtered wastewater is subjected to diffusion desalination continuously, so as to realize circular diffusion desalination.

The pure water used for the diffusion desalination is 0.5-0.6 of the weight of the pure water provided by the outside, the pure water is sufficient enough for the diffusion desalination, and the remaining pure water is spare for next use. The diffusion desalination is performed with a spiral wound membrane, the membrane has an effective area of 20 $m^2$, and the diffusion desalting is performed at a rate of 15 $g/(m^2 \cdot h)$.

3. Reverse osmosis: When the diffusion desalination circulating water has a salt concentration of 20-25 g/L, 200 kg of the diffusion desalination circulating water is subjected to concentration by reverse osmosis to produce 120 kg of high-concentration salt water and 80 kg of pure water. The pure water is recovered into a pure water reserve vessel for diffusion desalination. The diffusion desalination circulating water used for the reverse osmosis is 0.5-0.7 of the weight of the pure water used for the diffusion desalting, and the diffusion desalination circulating water is sufficient enough to enable the high-concentration salt water produced by the reverse osmosis to be used for forward osmosis circulating water. The salt concentration of the diffusion desalination circulating water is controlled to further control the diffusion desalination rate, so that the diffusion desalination rate is maintained stable.

4. Forward osmosis: When the diffusion desalination wastewater has a salt concentration of 5-10 g/L, the diffusion desalination wastewater is subjected to forward osmosis with 80 kg of the high-concentration salt water produced by the reverse osmosis (keep circular operation), where the high-concentration salt water and the diffusion desalination wastewater have gradient concentrations at an interface of a cellulose triacetate (CTA) membrane, water in the diffusion desalination wastewater penetrates to the high-concentration salt water side to decrease the volume of the diffusion desalination wastewater, and forward osmosis wastewater is obtained, where the forward osmosis wastewater is desalted and concentrated wastewater.

In a forward osmosis process, the volume of the high-concentration salt water is increased, the salt concentration is decreased, and the diffusion desalination wastewater, as forward osmosis circulating water, is subjected to forward osmosis continuously, so as to realize circular forward osmosis.

All the salt in the organic wastewater cannot be completely removed by the diffusion desalination to ensure that the wastewater after the desalination has a certain content of salt, which is used as an inorganic salt nutrient component required for subsequent biochemical treatment. The biochemical treatment cannot be performed when the salt content is low, and the biochemical treatment is difficult to perform when the salt content is high.

When the salt concentration of the forward osmosis circulating water is decreased to 15-25 g/L, 200 kg of the forward osmosis circulating water is subjected to reverse osmosis to produce high-concentration salt water and pure water continuously. The weight of the forward osmosis circulating water used for the reverse osmosis is 2-3 times of the weight of the high-concentration salt water produced by the reverse osmosis, which is used to control the concentration of the forward osmosis circulating water and ensure normal forward osmosis. The salt concentration of the forward osmosis circulating water is controlled to further control the forward osmosis rate, so that the forward osmosis rate is maintained stable.

The cellulose triacetate (CTA) membrane is used as a forward osmosis membrane, which has an effective area of 25 $m^2$ and a water flux of 20 $L/(m^2 \cdot h)$.

5. Evaporative crystallization: 40 kg of the remaining high-concentration salt water produced by the reverse osmosis is subjected to evaporative crystallization to obtain pure water and salt, the salt is refined for recycling, and the pure water is recovered into the pure water storage device for diffusion desalination.

The electrical conductivity is measured by an electrical conductivity meter, and then the salt concentration of the water is calculated. The salt flux is obtained based on changes of the salt content with time.

III. Experimental Results

The finally desalted wastewater has a weight of 667.3 kg, the wastewater is reduced by 32%, the wastewater has a salt content of 8 g/L and a COD content of 14984.7 mg/L, and 61 kg of salt and 306 kg of pure water are finally produced.

FIG. 2 shows the salt flux ($J_s$) in a diffusion desalination process and the rejection rate of organic matter in the diffusion desalination process. The rejection rate is 99.9% or above, and the salt flux is 15 $g/(m^2 \cdot h)$.

Example 3 Method for Desalination of High-Salt and High-Concentration Organic Wastewater by Coupling Three Membrane Separation Technologies I. Water quality of high-salt and high-concentration organic wastewater to be treated: The chemical oxygen demand (COD) is 15,000 mg/L, the NaCl content is 90 g/L, and the wastewater volume is 1 ton. The electrical conductivity is measured by an electrical conductivity meter, and then the salt concentration of the water is calculated.

II. Method for Desalination of Wastewater

The high-salt and high-concentration organic wastewater to be treated is subjected to desalination by using the device in Example 1.

1. Precise filtration: The high-salt and high-concentration organic wastewater to be treated is subjected to precise filtration to filter out solid particle impurities (suspended particles with a particle size of greater than 10μ) in the high-salt and high-concentration organic wastewater so as to obtain precisely filtered wastewater.

2. Diffusion desalination: When the operation begins, 500 kg of pure water is provided from the outside and stored in a pure water reserve vessel. Then, the precisely filtered wastewater is subjected to diffusion desalination with 300 kg of the pure water, where the precisely filtered wastewater and the pure water have gradient differences in concentration at an interface of a spiral wound membrane, salt is diffused from the precisely filtered wastewater side to the pure water side to decrease the salt content of the precisely filtered wastewater and increase the salt content of the pure water, and diffusion desalination wastewater is obtained. Meanwhile, after the salt content of the pure water is increased, diffusion desalination circulating water is obtained, and the precisely filtered wastewater is subjected to diffusion desalination continuously, so as to realize circular diffusion desalination.

The pure water used for the diffusion desalination is 0.5-0.6 of the weight of the pure water provided by the outside, the pure water is sufficient enough for the diffusion desalination, and the remaining pure water is spare for next use. The diffusion desalination is performed with a spiral wound membrane, the membrane has an effective area of 20 $m^2$, and the diffusion desalting is performed at a rate of 15 $g/(m^2 \cdot h)$.

3. Reverse osmosis: When the diffusion desalination circulating water has a salt concentration of 20-25 g/L, 200 kg of the diffusion desalination circulating water is subjected to concentration by reverse osmosis to produce 120 kg of high-concentration salt water and 80 kg of pure water. The pure water is recovered into the pure water reserve vessel for diffusion desalination. The diffusion desalination circulating water used for the reverse osmosis is 0.5-0.7 of the weight of the pure water used for the diffusion desalting, and the diffusion desalination circulating water is sufficient enough to enable the high-concentration salt water produced by the reverse osmosis to be used for forward osmosis circulating water. The salt concentration of the diffusion desalination circulating water is controlled to further control the diffusion desalination rate, so that the diffusion desalination rate is maintained stable.
4. Forward osmosis: When the diffusion desalination wastewater has a salt concentration of 5-10 g/L, the diffusion desalination wastewater is subjected to forward osmosis with 80 kg of the high-concentration salt water produced by the reverse osmosis (keep circular operation), where the high-concentration salt water and the diffusion desalination wastewater have gradient concentrations at an interface of a CTA membrane, water in the diffusion desalination wastewater penetrates to the high-concentration salt water side to decrease the volume of the diffusion desalination wastewater, and forward osmosis wastewater is obtained, where the forward osmosis wastewater is desalted and concentrated wastewater.

In a forward osmosis process, the volume of the high-concentration salt water is increased, the salt concentration is decreased, and the diffusion desalination wastewater, as forward osmosis circulating water, is subjected to forward osmosis continuously, so as to realize circular forward osmosis.

All the salt in the organic wastewater cannot be completely removed by the diffusion desalination to ensure that the wastewater after the desalination has a certain content of salt, which is used as an inorganic salt nutrient component required for subsequent biochemical treatment. The biochemical treatment cannot be performed when the salt content is low, and the biochemical treatment is difficult to perform when the salt content is high.

When the salt concentration of the forward osmosis circulating water is decreased to 15-25 g/L, 200 kg of the forward osmosis circulating water is subjected to reverse osmosis to produce high-concentration salt water and pure water continuously. The weight of the forward osmosis circulating water used for the reverse osmosis is 2-3 times of the weight of the high-concentration salt water produced by the reverse osmosis, which is used to control the concentration of the forward osmosis circulating water and ensure normal forward osmosis. The salt concentration of the forward osmosis circulating water is controlled to further control the forward osmosis rate, so that the forward osmosis rate is maintained stable.

The cellulose triacetate (CTA) membrane is used as a forward osmosis membrane, which has an effective area of 25 $m^2$ and a water flux of 20 $L/(m^2 \cdot h)$.

5. Evaporative crystallization: 40 kg of the remaining high-concentration salt water produced by the reverse osmosis is subjected to evaporative crystallization to obtain pure water and salt, the salt is refined for recycling, and the pure water is recovered into the pure water reserve vessel for diffusion desalination.

The electrical conductivity is measured by an electrical conductivity meter, and then the salt concentration of the water is calculated. The salt flux is obtained based on changes of the salt content with time.

III. Experimental Results

The finally desalted wastewater has a weight of 726.8 kg, the wastewater is reduced by 27%, the wastewater has a salt content of 10 g/L and a COD content of 20636.4 mg/L, and 76 kg of salt and 251 kg of pure water are produced.

FIG. 3 shows the salt flux ($J_s$) in a diffusion desalination process and the rejection rate of organic matter in the diffusion desalination process. The rejection rate is 99.9% or above, and the salt flux is 23 $g/(m^2 \cdot h)$.

Comparative Example 1 Treatment of High-Salt and High-Concentration Organic Wastewater by Ultrafiltration in Combination with Reverse Osmosis I. Water quality of high-salt and high-concentration organic wastewater to be treated: The chemical oxygen demand (COD) is 10,000 mg/L, the NaCl content is 70 g/L, and the wastewater volume is 1 ton. The electrical conductivity is measured by an electrical conductivity meter, and then the salt concentration of the water is calculated.

II. The diffusion desalination method in Example 1 is changed into ultrafiltration without forward osmosis. Precisely filtered wastewater is obtained by the steps in Example 1. The precisely filtered wastewater is subjected to ultrafiltration treatment to obtain ultrafiltration wastewater and ultrafiltration circulating water. The ultrafiltration circulating water is subjected to reverse osmosis according to the steps in Example 1 to produce high-concentration salt water and pure water, and the high-concentration salt water is subjected to evaporative crystallization to produce salt and pure water. The ultrafiltration wastewater is desalted wastewater.

The electrical conductivity is measured by an electrical conductivity meter, and then the salt concentration of the water is calculated. The salt flux is obtained based on changes of the salt content with time.

III. Experimental Results

The desalted wastewater has a mass of 521.6 kg, the wastewater is reduced by 47.8%, the wastewater has a salt content of 72 g/L and a COD content of 18647.7 mg/L, and 32 kg of salt and 456 kg of pure water are finally produced.

Changes of the water flux with time during ultrafiltration are shown in FIG. 4. By performing the ultrafiltration, desalination of the high-salt and high-concentration organic wastewater is difficult to perform, and concentrated high-salt and high-concentration organic wastewater is finally produced, which has difficulty in secondary treatment. In addition, the water production rate in the ultrafiltration process is continuously decreased, so that the operating time is further prolonged.

Finally, it is to be noted that the above embodiments are only used to illustrate the technical schemes of the present invention and are not intended to limit the scope of protection of the present invention. For persons of ordinary skill in the art, other changes or modifications in different forms can also be made on the basis of the above description and ideas, and it is not necessary or possible to illustrate all the embodiments herein. Any modifications, equivalent substitutions, improvements and the like made within the spirit and principles of the present invention shall be included in the scope of protection of the claims of the present invention.

What is claimed is:

1. A method for desalination of wastewater by coupling three membrane separation technologies, comprising the following steps:

step S1: subjecting wastewater to diffusion desalination to obtain diffusion desalination wastewater and diffusion desalination circulating water;

step S2: subjecting the diffusion desalination circulating water in the step S1 to reverse osmosis to obtain pure water and high-concentration salt water; and step S3: subjecting the diffusion desalination wastewater in the step S1 to forward osmosis to obtain forward osmosis wastewater and forward osmosis circulating water, wherein the forward osmosis wastewater is desalted and concentrated wastewater; and subjecting the forward osmosis circulating water to reverse osmosis to obtain pure water and high-concentration salt water.

2. The method for desalination of wastewater according to claim 1, wherein in the step S1, the wastewater is subjected to the diffusion desalination with pure water or diffusion desalination circulating water.

3. The method for desalination of wastewater according to claim 2, wherein in step S1, the wastewater is subjected to circular diffusion desalination with the pure water in step S2 and/or step S3.

4. The method for desalination of wastewater according to claim 1, wherein in step S3, the diffusion desalination wastewater is subjected to the forward osmosis with the high-concentration salt water in the step S2 or the forward osmosis circulating water in the step S3.

5. The method for desalination of wastewater according to claim 1, wherein the high-concentration salt water in the step S2 and/or the step S3 is subjected to evaporative crystallization to obtain pure water and salt.

6. The method for desalination of wastewater according to claim 1, wherein in the step S2, the diffusion desalination circulating water is subjected to the reverse osmosis when having a salt concentration of 20-25 g/L.

7. The method for desalination of wastewater according to claim 1, wherein in the step S3, the forward osmosis circulating water is subjected to the reverse osmosis when having a salt concentration of 15-25 g/L.

8. The method for desalination of wastewater according to claim 1, wherein in the step S3, the diffusion desalination wastewater is subjected to the forward osmosis when having a salt concentration of 5-10 g/L.

9. The method for desalination of wastewater according to claim 1, wherein the wastewater is high-salt and high-concentration organic wastewater.

10. The method for desalination of wastewater according to claim 2, wherein the wastewater is high-salt and high-concentration organic wastewater.

11. The method for desalination of wastewater according to claim 3, wherein the wastewater is high-salt and high-concentration organic wastewater.

12. The method for desalination of wastewater according to claim 4, wherein the wastewater is high-salt and high-concentration organic wastewater.

13. The method for desalination of wastewater according to claim 5, wherein the wastewater is high-salt and high-concentration organic wastewater.

14. The method for desalination of wastewater according to claim 6, wherein the wastewater is high-salt and high-concentration organic wastewater.

15. The method for desalination of wastewater according to claim 7, wherein the wastewater is high-salt and high-concentration organic wastewater.

16. The method for desalination of wastewater according to claim 8, wherein the wastewater is high-salt and high-concentration organic wastewater.

17. An apparatus for desalination of wastewater by coupling three membrane separation technologies, wherein the wastewater treatment apparatus comprises a pretreatment device, a diffusion desalination device, a forward osmosis device and a salt recovery device that are communicated with each other;

the pretreatment device comprises a wastewater storage device, a pretreatment device body and a pretreatment post-storage device that are sequentially communicated with each other;

the diffusion desalination device comprises a wastewater circulation storage device, a diffusion desalination component, a diffusion desalination circulating water storage device and a pure water storage device that are sequentially communicated with each other;

the pretreatment post-storage device of the pretreatment device is communicated with the wastewater circulation storage device of the diffusion desalination device;

the forward osmosis device comprises a to-be-treated wastewater storage device, an organic wastewater circulation storage device, a forward osmosis component and a draw solution circulation storage device that are sequentially communicated with each other;

the wastewater circulation storage device of the diffusion desalination device is communicated with the forward osmosis component of the forward osmosis device;

the salt recovery device comprises a reverse osmosis device and a mechanical vapor recompression (MVR) device that are communicated with each other; the reverse osmosis device comprises a reverse osmosis circulating water storage device and a reverse osmosis component that are communicated with each other;

the diffusion desalination circulating water storage device of the diffusion desalination device is communicated with the reverse osmosis circulating water storage device of the reverse osmosis device of the salt recovery device;

the pure water storage device of the diffusion desalination device is communicated with the reverse osmosis component of the reverse osmosis device of the salt recovery device; the pure water storage device of the diffusion desalination device is communicated with the mechanical vapor recompression (MVR) device of the salt recovery device;

the draw solution circulation storage device of the forward osmosis device is communicated with the reverse osmosis circulating water storage device of the reverse osmosis device of the salt recovery device; and the reverse osmosis circulating water storage device of the reverse osmosis device of the salt recovery device is communicated with the mechanical vapor recompression (MVR) device of the salt recovery device.

* * * * *